United States Patent
Ly et al.

(10) Patent No.: US 10,956,996 B2
(45) Date of Patent: Mar. 23, 2021

(54) METHOD, SYSTEM, AND COMPUTER PROGRAM PRODUCT FOR GENERATING RECOMMENDATIONS BASED ON PREDICTED ACTIVITY

(71) Applicant: Visa International Service Association, San Francisco, CA (US)

(72) Inventors: Phan Huong Ly, Singapore (SG); Mohanraj Ragupathiraj, Singapore (SG); Pranjul Singhai, Singapore (SG); Dinesh Moorthi Subburaman, Singapore (SG); Madhavi Vaddepalli, Singapore (SG); Saurav Verma, Singapore (SG)

(73) Assignee: Visa International Service Association, San Francisco, CA (US)

( * ) Notice: Subject to any disclaimer, the term of this patent is extended or adjusted under 35 U.S.C. 154(b) by 114 days.

(21) Appl. No.: 16/152,713

(22) Filed: Oct. 5, 2018

(65) Prior Publication Data
US 2020/0111184 A1 Apr. 9, 2020

(51) Int. Cl.
*G06Q 30/00* (2012.01)
*G06Q 50/14* (2012.01)
*G06Q 30/02* (2012.01)
*G06N 5/02* (2006.01)

(52) U.S. Cl.
CPC ............ *G06Q 50/14* (2013.01); *G06N 5/022* (2013.01); *G06Q 30/0255* (2013.01); *G06Q 30/0264* (2013.01)

(58) Field of Classification Search
None
See application file for complete search history.

(56) References Cited

U.S. PATENT DOCUMENTS

| | | | |
|---|---|---|---|
| 8,719,094 B1 | 5/2014 | Klein et al. | |
| 9,170,863 B2 * | 10/2015 | Varoglu | ............ G06F 16/24565 |
| 9,471,926 B2 | 10/2016 | Clyne | |
| 9,686,386 B1 * | 6/2017 | Kubasik | ............... G06Q 10/025 |
| 2003/0229897 A1 | 12/2003 | Frisco et al. | |
| 2007/0061333 A1 | 3/2007 | Ramer et al. | |
| 2010/0228577 A1 * | 9/2010 | Cunningham | ......... G06Q 10/02 705/5 |

(Continued)

OTHER PUBLICATIONS

Inflight promotions—how to communicate with passengers onboard?, 2017, PXCom (Year: 2017).*

(Continued)

*Primary Examiner* — Naresh Vig
(74) *Attorney, Agent, or Firm* — The Webb Law Firm

(57) ABSTRACT

A computer-implemented method of generating recommendations based on predicted activity includes: receiving transaction data associated with a first transaction initiated by a user; determining, based on the transaction data, that the first transaction is associated with a travel purchase; in response to determining that the first transaction is associated with a travel purchase, identifying itinerary information associated with a trip; and automatically initiating at least one target action based on the itinerary information. A system and computer program product for generating recommendations based on predicted activity is also disclosed.

12 Claims, 9 Drawing Sheets

(56) References Cited

U.S. PATENT DOCUMENTS

| | | | |
|---|---|---|---|
| 2011/0225257 A1* | 9/2011 | Tilden | G06F 16/9535 |
| | | | 709/207 |
| 2012/0330714 A1 | 12/2012 | Malaviya et al. | |
| 2013/0024364 A1 | 1/2013 | Shrivastava et al. | |
| 2013/0191198 A1 | 7/2013 | Carlson et al. | |
| 2013/0218641 A1 | 8/2013 | Graham et al. | |
| 2013/0325616 A1* | 12/2013 | Ramde | G06Q 30/0261 |
| | | | 705/14.58 |
| 2014/0344069 A1 | 11/2014 | Haggerty et al. | |
| 2017/0193550 A1* | 7/2017 | Misra | G06Q 10/02 |

OTHER PUBLICATIONS

Inmarsat aviation, "Advertising, big data and the power of personalisation", 2019, 9 pages, https://www.inmarsataviation.com/benefits/revenue-opportunities/Advertising-big-data-and-the-power-of-personalisation.

* cited by examiner

METHOD, SYSTEM, AND COMPUTER PROGRAM PRODUCT FOR GENERATING RECOMMENDATIONS BASED ON PREDICTED ACTIVITY

BACKGROUND OF THE INVENTION

Field of the Invention

The present invention is directed to generating recommendations for users and, in one particular embodiment, to a system, method, and computer program product for generating recommendations based on predicted activity.

Description of Related Art

Portable financial devices, such as credit cards, debit cards, and/or electronic wallet applications, allow users the flexibility to make purchases outside of the user's home country. In contrast, using cash for foreign transactions often requires users to first go to a financial institution to exchange home currency for foreign currency, which can include additional fees imposed by the financial institution for performing the currency exchange.

However, in order to provide users protection from fraud, transaction service providers have developed methods of monitoring user accounts for activity that may indicate fraud. One such activity that may indicate fraud is a transaction conducted in a foreign country without the user having first placed a foreign travel notice on the account. Therefore, without a traveler providing a foreign travel notice to the portable financial device issuing institution and/or transaction service provider, the traveler may raise a fraud alert by making a legitimate purchase with the portable financial device in a foreign country.

Furthermore, because users traveling to foreign countries are away from their homes, their spending may oftentimes be increased for the duration of the travel. For instance, travelers often purchase meals, transportation, overnight accommodations, souvenirs, and items unintentionally left at home (e.g., clothing, toiletries, and/or the like) more frequently compared to when not traveling. Thus, overall, spending while traveling in a foreign country may be increased for many users.

Therefore, there is a need in the art for portable financial device issuing institutions and/or transaction service providers to be able to determine when a user may travel. Being able to determine when the user may travel allows the issuing institutions and/or transaction service providers to avoid false fraud alerts from a user's legitimate foreign transactions and to offer the user timely travel benefits and/or incentives.

SUMMARY OF THE INVENTION

Accordingly, it is an object of the present invention to provide a method, system, and computer program product for generating recommendations based on predicted activity.

According to a non-limiting embodiment or aspect, a computer-implemented method of generating recommendations based on predicted activity, includes: receiving, with at least one processor, transaction data associated with a first transaction initiated by a user; determining, with at least one processor and based on the transaction data, that the first transaction is associated with a travel purchase; in response to determining that the first transaction is associated with a travel purchase, identifying, with at least one processor, itinerary information associated with a trip; and automatically initiating, with at least one processor, at least one target action based on the itinerary information.

In one non-limiting embodiment or aspect, the itinerary information may include at least one date or time associated the trip or at least one destination associated with the trip. The target action may include communicating an offer to a user device associated with the user, where the offer is communicated to the user prior to or during the at least one date or time associated with the trip. The at least one date or time associated with the trip may include a time associated with a takeoff time of a flight associated with the trip. The target action may include communicating an offer to a user device associated with the user, where the offer is communicated to the user in-flight. The target action may include communicating an offer to a user device associated with the user, where the offer is associated with an activity proximate the at least one destination associated with the trip. The first transaction may be associated with purchase of an airline ticket or a hotel accommodation.

According to a non-limiting embodiment or aspect, a system for generating recommendations based on predicted activity includes at least one processor programmed or configured to: receive transaction data associated with a first transaction initiated by a user; determine, based on the transaction data, that the first transaction is associated with a travel purchase; in response to determining that the first transaction is associated with a travel purchase, identify itinerary information associated with a trip; and automatically initiate at least one target action based on the itinerary information.

In one non-limiting embodiment or aspect, the itinerary information may include at least one date or time associated the trip or at least one destination associated with the trip. The target action may include communicating an offer to a user device associated with the user, where the offer is communicated to the user prior to or during the at least one date or time associated with the trip. The at least one date or time associated with the trip may include a time associated with a takeoff time of a flight associated with the trip. The target action may include communicating an offer to a user device associated with the user, where the offer is communicated to the user in-flight. The target action may include communicating an offer to a user device associated with the user, where the offer is associated with an activity proximate the at least one destination associated with the trip. The first transaction may be associated with purchase of an airline ticket or a hotel accommodation.

According to a non-limiting embodiment or aspect, a computer program product for generating recommendations based on predicted activity includes at least one non-transitory computer-readable medium including one or more instructions that, when executed by at least one processor, cause the at least one processor to: receive transaction data associated with a first transaction initiated by a user; determine, based on the transaction data, that the first transaction is associated with a travel purchase; in response to determining that the first transaction is associated with a travel purchase, identify itinerary information associated with a trip; and automatically initiate at least one target action based on the itinerary information.

In one non-limiting embodiment or aspect, the itinerary information may include at least one date or time associated the trip or at least one destination associated with the trip. The target action may include communicating an offer to a user device associated with the user, where the offer is communicated to the user prior to or during the at least one date or time associated with the trip. The at least one date or time associated with the trip may include a time associated with a takeoff time of a flight associated with the trip. The target action may include communicating an offer to a user device associated with the user, where the offer is communicated to the user in-flight. The target action may include communicating an offer to a user device associated with the user, where the offer is associated with an activity proximate the at least one destination associated with the trip. The first transaction may be associated with purchase of an airline ticket or a hotel accommodation.

Further non-limiting embodiments or aspects will now be set forth in the following numbered clauses.

Clause 1: A computer-implemented method of generating recommendations based on predicted activity, comprising: receiving, with at least one processor, transaction data associated with a first transaction initiated by a user; determining, with at least one processor and based on the transaction data, that the first transaction is associated with a travel purchase; in response to determining that the first transaction is associated with a travel purchase, identifying, with at least one processor, itinerary information associated with a trip; and automatically initiating, with at least one processor, at least one target action based on the itinerary information.

Clause 2: The method of clause 1, wherein the itinerary information comprises at least one date or time associated the trip or at least one destination associated with the trip.

Clause 3: The method of clause 1 or 2, wherein the target action comprises communicating an offer to a user device associated with the user, wherein the offer is communicated to the user prior to or during the at least one date or time associated with the trip.

Clause 4: The method of any of clauses 1-3, wherein the at least one date or time associated with the trip comprises a time associated with a takeoff time of a flight associated with the trip.

Clause 5: The method of any of clauses 1-4, wherein the target action comprises communicating an offer to a user device associated with the user, wherein the offer is communicated to the user in-flight.

Clause 6: The method of any of clauses 1-5, wherein the target action comprises communicating an offer to a user device associated with the user, wherein the offer is associated with an activity proximate the at least one destination associated with the trip.

Clause 7: The method of any of clauses 1-6, wherein the first transaction is associated with purchase of an airline ticket or a hotel accommodation.

Clause 8: A system for generating recommendations based on predicted activity comprising at least one processor programmed or configured to: receive transaction data associated with a first transaction initiated by a user; determine, based on the transaction data, that the first transaction is associated with a travel purchase; in response to determining that the first transaction is associated with a travel purchase, identify itinerary information associated with a trip; and automatically initiate at least one target action based on the itinerary information.

Clause 9: The system of clause 8, wherein the itinerary information comprises at least one date or time associated the trip or at least one destination associated with the trip.

Clause 10: The system of clause 8 or 9, wherein the target action comprises communicating an offer to a user device associated with the user, wherein the offer is communicated to the user prior to or during the at least one date or time associated with the trip.

Clause 11: The system of any of clauses 8-10, wherein the at least one date or time associated with the trip comprises a time associated with a takeoff time of a flight associated with the trip.

Clause 12: The system of any of clauses 8-11, wherein the target action comprises communicating an offer to a user device associated with the user, wherein the offer is communicated to the user in-flight.

Clause 13: The system of any of clauses 8-12, wherein the target action comprises communicating an offer to a user device associated with the user, wherein the offer is associated with an activity proximate the at least one destination associated with the trip.

Clause 14: The system of any of clauses 8-13, wherein the first transaction is associated with purchase of an airline ticket or a hotel accommodation.

Clause 15: A computer program product for generating recommendations based on predicted activity, the computer program product comprising at least one non-transitory computer-readable medium including one or more instructions that, when executed by at least one processor, cause the at least one processor to: receive transaction data associated with a first transaction initiated by a user; determine, based on the transaction data, that the first transaction is associated with a travel purchase; in response to determining that the first transaction is associated with a travel purchase, identify itinerary information associated with a trip; and automatically initiate at least one target action based on the itinerary information.

Clause 16: The computer program product of clause 15, wherein the itinerary information comprises at least one date or time associated the trip or at least one destination associated with the trip.

Clause 17: The computer program product of clause 15 or 16, wherein the target action comprises communicating an offer to a user device associated with the user, wherein the offer is communicated to the user prior to or during the at least one date or time associated with the trip.

Clause 18: The computer program product of any of clauses 15-17, wherein the at least one date or time associated with the trip comprises a time associated with a takeoff time of a flight associated with the trip.

Clause 19: The computer program product of any of clauses 15-18, wherein the target action comprises communicating an offer to a user device associated with the user, wherein the offer is communicated to the user in-flight.

Clause 20: The computer program product of any of clauses 15-19, wherein the target action comprises communicating an offer to a user device associated with the user, wherein the offer is associated with an activity proximate the at least one destination associated with the trip.

Clause 21: The computer program product of any of clauses 15-20, wherein the first transaction is associated with purchase of an airline ticket or a hotel accommodation.

These and other features and characteristics of the present invention, as well as the methods of operation and functions of the related elements or structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE INVENTION

Figure 1:
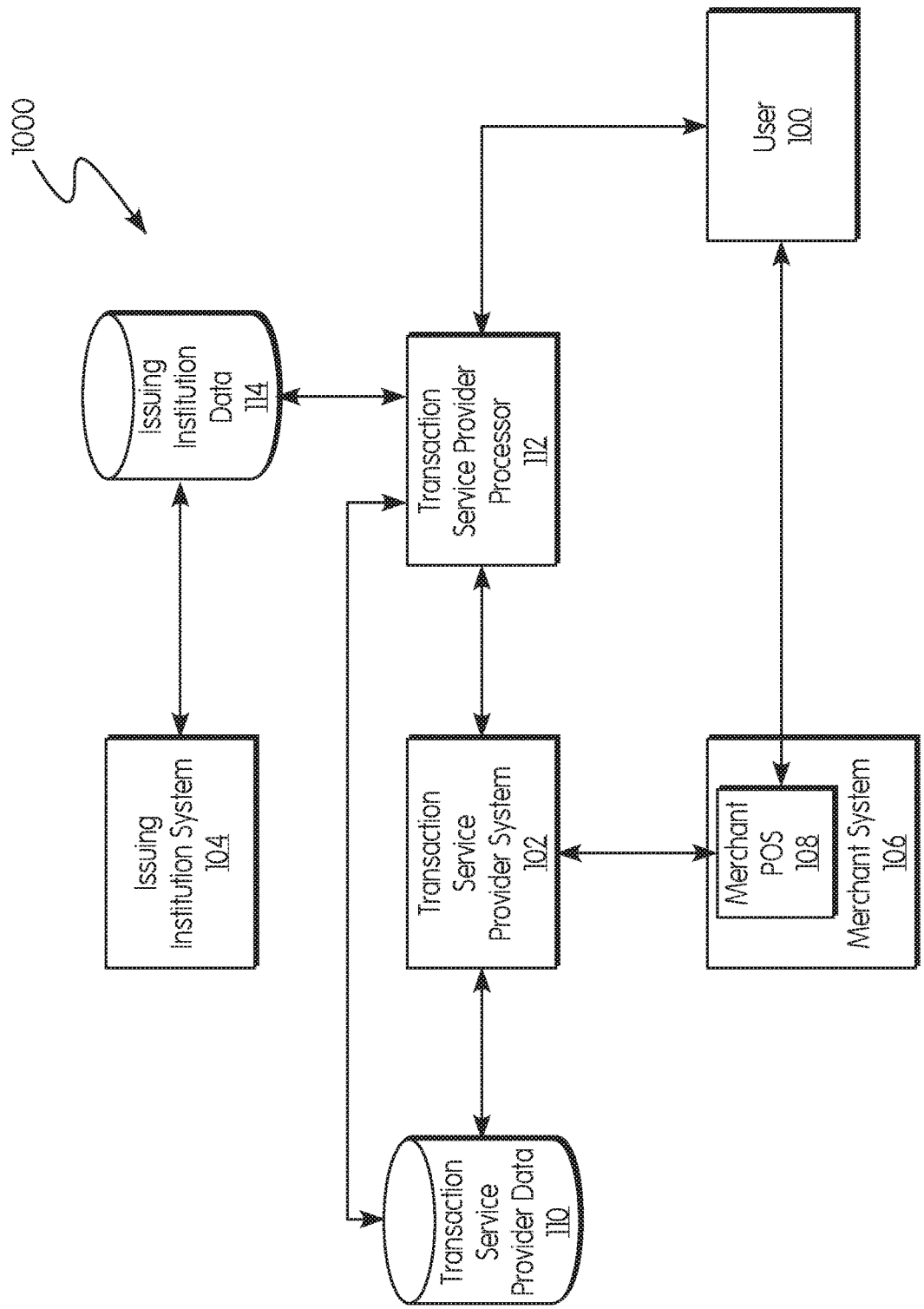
FIG. 1 is a schematic diagram of a system for segmenting a plurality of users in a first region based on predicted activity external to the first region according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "portable financial device" or "portable device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a personal digital assistant, a pager, a security card, a computer, an access card, a wireless terminal, and/or a transponder, as examples. The portable financial device may include a volatile or a non-volatile memory to store information, such as an account identifier or a name of an account holder. A portable financial device transaction may refer to a transaction initiated with a portable financial device and an account identifier.

As used herein, the terms "issuing institution," "portable financial device issuer," "issuer," or "issuer bank" may refer to one or more entities that provide accounts to customers for conducting payment transactions, such as initiating credit and/or debit payments. For example, an issuing institution may provide an account identifier, such as a personal account number (PAN), to a customer that uniquely identifies one or more accounts associated with that customer. The account identifier may be embodied on a portable financial device such as a physical financial instrument, e.g., a payment card, and/or may be electronic and used for electronic payments. As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they may be used to conduct a transaction without directly using the original account identifier. In some examples, an original account identifier, such as a PAN, may be associated with a plurality of tokens for different individuals or purposes. An issuing institution may be associated with a bank identification number (BIN) that uniquely identifies it. The terms "issuing institution" and "issuing institution system" may also refer to one or more computer systems operated by or on behalf of an issuing institution, such as a server computer executing one or more software applications. For example, an issuing institution system may include one or more authorization servers for authorizing a payment transaction.

As used herein, the term "merchant" refers to an individual or entity that provides goods and/or services, or access to goods and/or services, to customers based on a transaction, such as a payment transaction. The term "merchant" may also refer to one or more computer systems operated by or on behalf of a merchant, such as a server computer executing one or more software applications. As used herein, a "merchant point-of-sale (POS) system" may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that may be used to initiate a payment transaction. A merchant POS system may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing system may include one or more processors and, in some non-limiting embodiments, may be operated by or on behalf of a transaction service provider.

Non-limiting embodiments or aspects of the present invention are directed to a method, system, and computer program product for generating recommendations based on predicted activity. Non-limiting embodiments or aspects allow for transaction service providers and/or issuing institutions to predict when a user may travel. Non-limiting embodiments or aspects further allow transaction service providers and/or issuing institutions to identify itinerary information associated with the travel plans of the user. From the transaction service provider and/or the issuing institutions accessing the itinerary information associated with the user's travel plans, non-limiting embodiments or aspects allow for transaction service providers and/or issuing institutions to avoid false fraud alerts from a user's transaction initiated during travel, which may otherwise have been flagged as a suspicious transaction. Furthermore, non-limiting embodiments or aspects allow transaction service providers and/or issuing institutions to communicate targeted offers which are relevant to the users based on their itinerary information. Non-limiting embodiments or aspects also allow transaction service providers and/or issuing institutions to communicate targeted offers to users during downtime of the user during travel, such as while waiting in a terminal or while the user is in flight, so that the offer is presented to the user at a more convenient and useful time.

Segmenting Users Based on Predicted Activity

Referring now to FIG. 1, a system 1000 for segmenting a plurality of users in a first region based on predicted activity external to the first region is shown according to a non-limiting embodiment. A user 100 may be a holder of a portable financial device (e.g., an account holder) associated with a transaction service provider and issued to the user 100 by an issuing institution. In some non-limiting embodiments, the user 100 is a holder of a portable financial device issued by an issuing institution. The user 100 may use the portable financial device to initiate financial transactions with various merchants systems 106 operated by or on behalf of a merchant, such as using a merchant POS 108, which communicates with the transaction service provider system 102 to complete payment of the financial transactions. In some non-limiting embodiments, the user 100 may purchase goods or services from the merchant using a portable financial device and the merchant POS 108 to guarantee payment for the goods and/or services.

With continued reference to FIG. 1, the user 100 may reside in a first region. As used herein, the term "reside" may mean that the user 100 is a citizen, permanent resident, or non-permanent resident in the first region. The user 100 may live at an address in the first region, and the user's account may be associated with that address. A user account may be associated with an address, residence, or place of business. The user 100 may be a holder of a portable financial device in the first region. For instance, the user's 100 mailing address and/or billing address may be located in the first region. The first region may be any definable geographic region. In some non-limiting embodiments, the first region is a neighborhood, township, town, municipality, borough, city, district, county, parish, state, commonwealth, province, territory, colony, country, continent, hemisphere, or some collection or combination thereof. The first region may also be any other arbitrarily defined geographical area, as determined by the transaction service provider or the issuing institution. At least one second region may be defined as an area geographically outside of (external to) the first region. In some non-limiting embodiments, the first region is a specific first country associated with a user account, and the second region is every other country except the first country, such as the first region being the United States of America and the second region being all other countries. In some non-limiting embodiments, the first region is a specific first state, and the second region is every other state except the first state, as well as every other country, such as the first region being Pennsylvania and the second region being all other states in the United States of America, as well as every other country. In some examples, the second region may be a subset of regions external to the first region.

The merchant selling goods or services to the user 100 may be a domestic merchant or a foreign merchant. "Domestic merchant" may refer to a merchant located in or initiating a transaction in the first region associated with the user 100. "Foreign merchant" may refer to a merchant located in or initiating a transaction in the second region associated with the user 100. Whether the merchant is a domestic merchant or a foreign merchant may depend on the location at which the transaction between the user 100 and the merchant is considered to take place. For instance, a transaction may be considered to take place at a brick-and-mortar location (whether it be in the first region or second region associated with the user 100) of the merchant if the user 100 is physically present in the brick-and-mortar location to initiate the transaction. For instance, a transaction may be considered to take place in the first region of the user 100 when the transaction is initiated online and billed and/or shipped to the user's 100 address in the first region 100. However, any other relevant transaction scenario may be considered when determining the location of the transaction.

In the example system 1000 shown in FIG. 1, the merchant POS 108 may communicate with the transaction service provider system 102 during financial transactions between the user 100 and the merchant. During these transactions, the transaction service provider system 102 may collect transaction data relating to the financial transactions and communicate that data to a transaction service provider database 110. The transaction service provider database 110 may be located at the transaction service provider or elsewhere. Over time, the transaction service provider database 110 may store historical transaction data (e.g., prior transaction data) and other information about a plurality of users who use portable financial devices associated with the transaction service provider. For instance, the transaction service provider system 102 may collect various information about each of its account holders, including information about each purchase or each non-purchase transaction (e.g., an automated teller machine transaction or account funding transfer transaction) that account holder has made using the portable financial device associated with the transaction service provider. This historical transaction data may be analyzed later by the transaction service provider system 102.

In some non-limiting embodiments, the transaction service provider database 110 may include data associated with the following categories of transaction data: overall usage of portable financial device, usage of portable financial device on travel and entertainment, usage of portable financial device on retail, past cross-border behavior usage. These categories of transaction data may further include transaction parameters. In some non-limiting embodiments, the transaction parameters of the transaction categories may include: a frequency of transactions, a transaction spend, a consistency of usage, a frequency or amount of electronic commerce transactions, a frequency or amount of airline transactions, a frequency or amount of travel service transactions, a frequency or amount of lodging transactions, a frequency or amount of retail transactions, a frequency or amount of restaurant transactions, a frequency or amount of general retail transactions, a frequency or amount of apparel retail transactions, a frequency of transactions in the at least one second region, a transaction spend in the at least one second region, a consistency of transactions in the at least one second region, past travel behavior, merchant preferences, amount or frequency of seasonal purchases, number of channels though which user has initiated a transaction, spend behavior, or any combination thereof. It will be appreciated that this list of categories of transaction data and/or transaction parameters within the categories of transaction data is not limited to the above list, and any relevant parameters may also be included.

Another category of transaction data may include external factors, which may not be stored in the transaction service provider database 110. The external factors category may include transaction parameters (also referred to as external transaction parameters) including: a change in currency exchange (such as exchange rate), a holiday or event schedule in at least one of the first region and the at least one second region, a time of year, or any combination thereof. These parameters may be predetermined and/or obtained from one or more third party sources, such as government databases.

With continued reference to FIG. 1, the example system 1000 may include a transaction service provider processor 112 owned and/or controlled by or on behalf of the transaction service provider. The transaction service provider processor 112 may be located at the transaction service provider or elsewhere. The transaction service provider database 110 may be in communication with the transaction service provider system 102 and/or the transaction service provider processor 112. In some embodiments, the transaction service provider processor 112 may be a separate computer system or, in other examples, may be part of the transaction service provider system 102.

The transaction service provider processor 112 may also be in communication with an issuing institution database 114 which, like the transaction service provider database 110, may include information about each user. The issuing institution database 114 may be located at the issuing institution or elsewhere. The issuing institution database 114 may include information about each user collected by the issuing institution system 104. In some non-limiting embodiments, the issuing institution database 114 may include the following information: personal information (e.g., name, age, gender, mailing address, phone number, email address, social security number, driver's license number, marital status, occupation, and/or the like) and/or various financial information (e.g., credit score, credit score history, bank account number, account identifier, monthly salary, yearly salary, and/or the like). Some of the information in the transaction service provider database 110 and the issuing institution database 114 may be duplicative.

In a non-limiting embodiment of the system 1000 shown in FIG. 1, in response to segmenting a user, the transaction service provider processor 112 may automatically initiate at least one target action by communicating with the user 100 or some group of target users. Such communication may include a web-based communication, an email communication, a text message, a telephone call, a push notification, and/or an instant message. The transaction service provider processor 112 may identify at least one offer for the user 100 and communicate that offer to that user 100 (e.g., a computing device of the user). The offer may be any benefit, such as a discount, coupon, cash back, promotional item, sweepstakes, or any other incentive to the user 100. The offer may be related to travel, such as an offer for typical travel products and/or services, or offers for products and/or services typical for use or purchase in the second region. The communication may also be informational or associated with incentivizing the user 100 to use the portable financial device in connection with travel in the second region. The user 100 may also communicate with the transaction service provider processor 112 using like communication methods.

Figure 2:
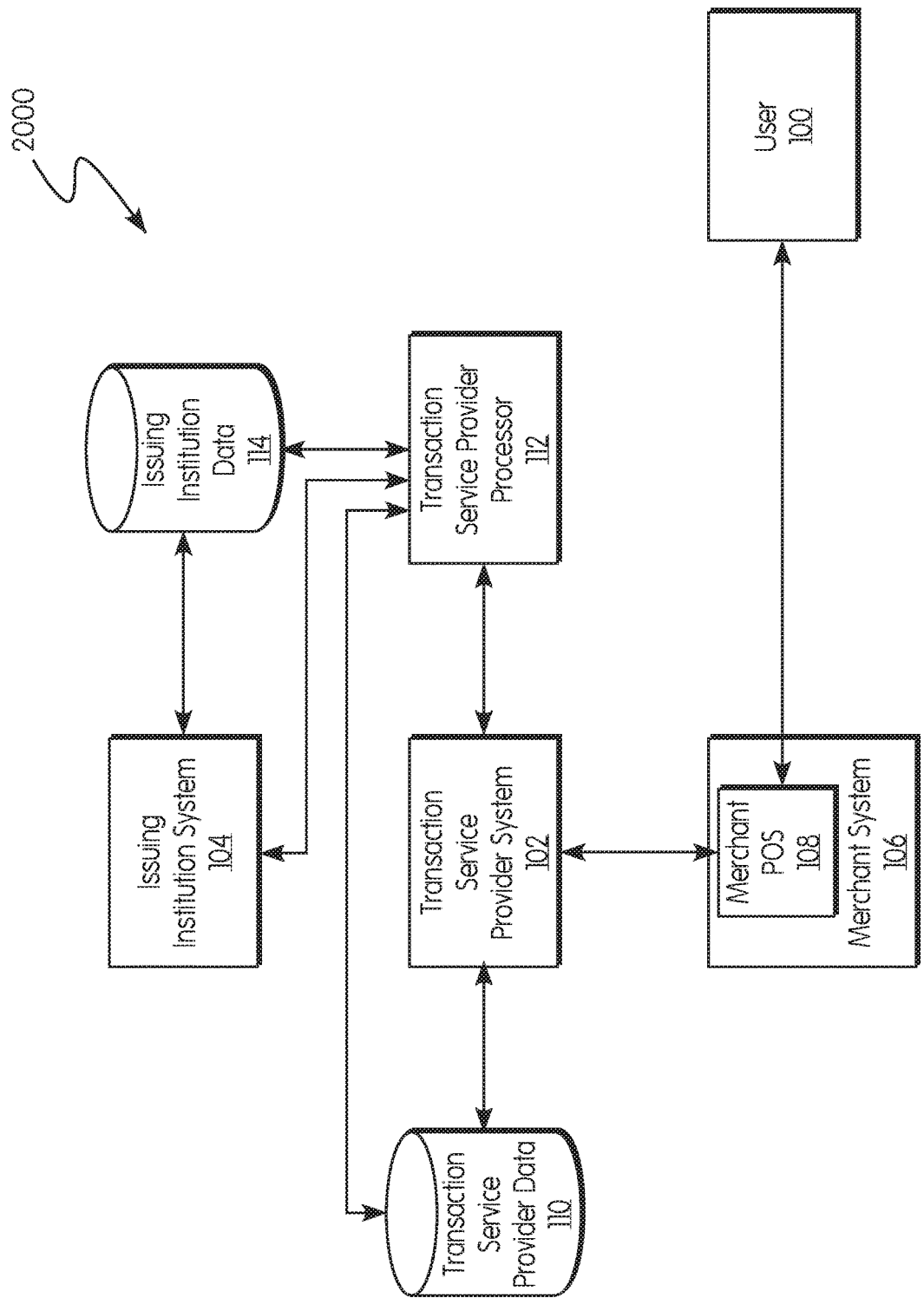
FIG. 2 is another schematic diagram of a system for segmenting a plurality of users in a first region based on predicted activity external to the first region according to a non-limiting embodiment.

Referring to FIG. 2, a system 2000 for segmenting a plurality of users in a first region based on predicted activity external to the first region is shown according to a non-limiting embodiment. The components of the system 2000 in FIG. 2 include all of the capabilities and characteristics of the components from the system 1000 of FIG. 1 having like reference numbers. In a non-limiting embodiment of the system 2000 shown in FIG. 2, the transaction service provider processor 112 may initiate at least one target action by communicating with the issuing institution system 104 or the issuing institution database 114. The issuing institution database 114 may be hosted by or on behalf of the issuing institution. In some non-limiting embodiments, the transaction service provider processor 112 generates at least one list of target users associated with the issuing institution and communicates that list of target users to the issuing institution system 104 or the issuing institution database 114. The issuing institution system 104 may take a further target action based on the list.

Figure 3:
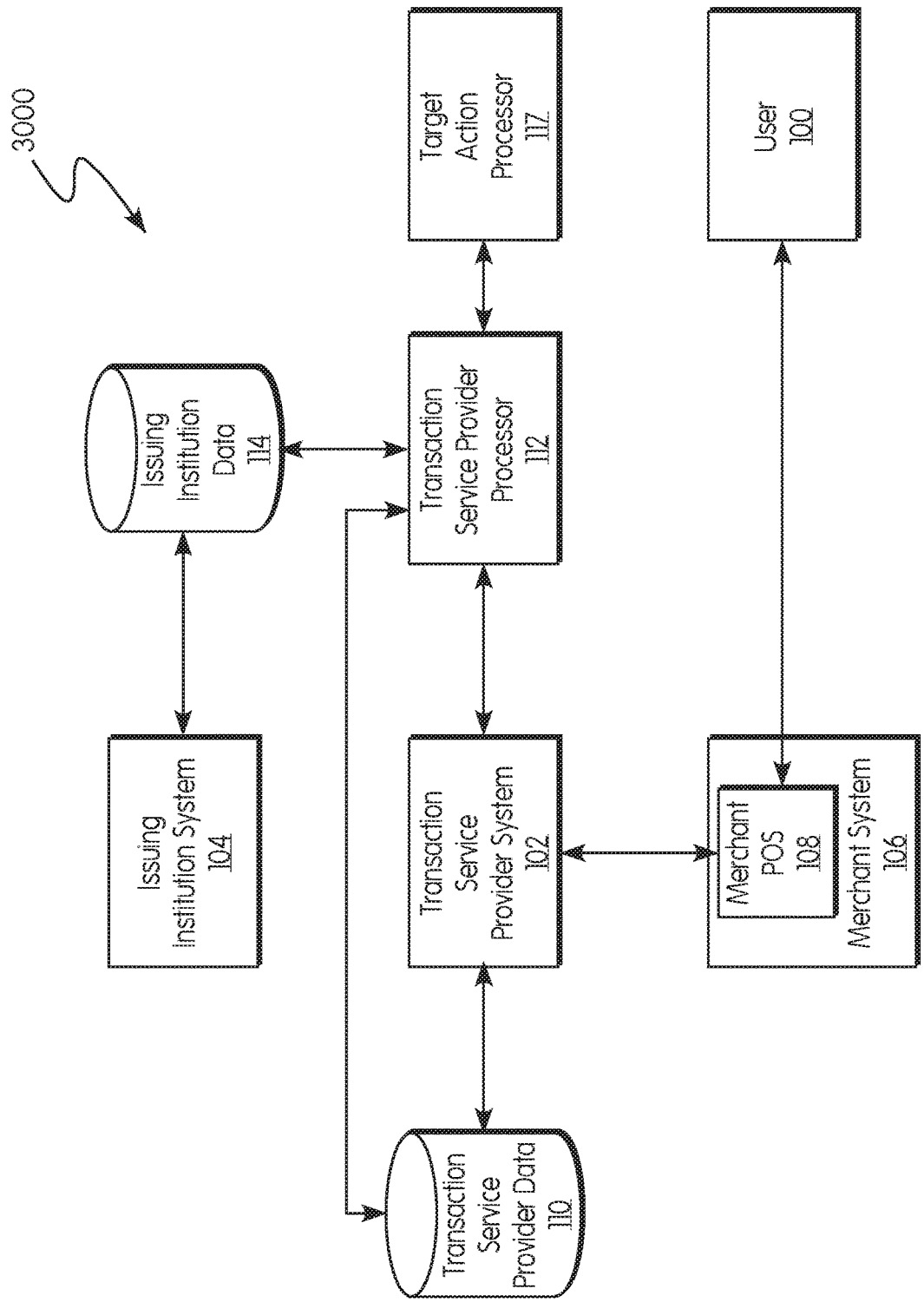
FIG. 3 is another schematic diagram of a system for segmenting a plurality of users in a first region based on predicted activity external to the first region according to a non-limiting embodiment.

Referring to FIG. 3, a system 3000 for segmenting a plurality of users in a first region based on predicted activity external to the first region is shown according to a non-limiting embodiment. The components of the system 3000 in FIG. 3 include all of the capabilities and characteristics of the components from the system 1000 of FIG. 1 having like reference numbers. In some non-limiting embodiments of the system 3000 shown in FIG. 3, the transaction service processor 112 may initiate a target action by transmitting a signal to a target action processor 117. The target action processor 117 may be a separate computer system or, in other examples, may be a part of the transaction service provider processor 112. This target action may include automatically approving a user of a plurality of target users for transactions in the at least one second region. This approval may be advantageous for avoiding a rejection of a transaction in the second region merely because the transaction is occurring in the second region or because that user neglected to place a foreign travel notice on the portable financial device being used. A target action may also include any other action directed to incentivizing, educating, or encouraging a user in the subset of target users to use their portable financial device in the first region or second region.

Figure 4:
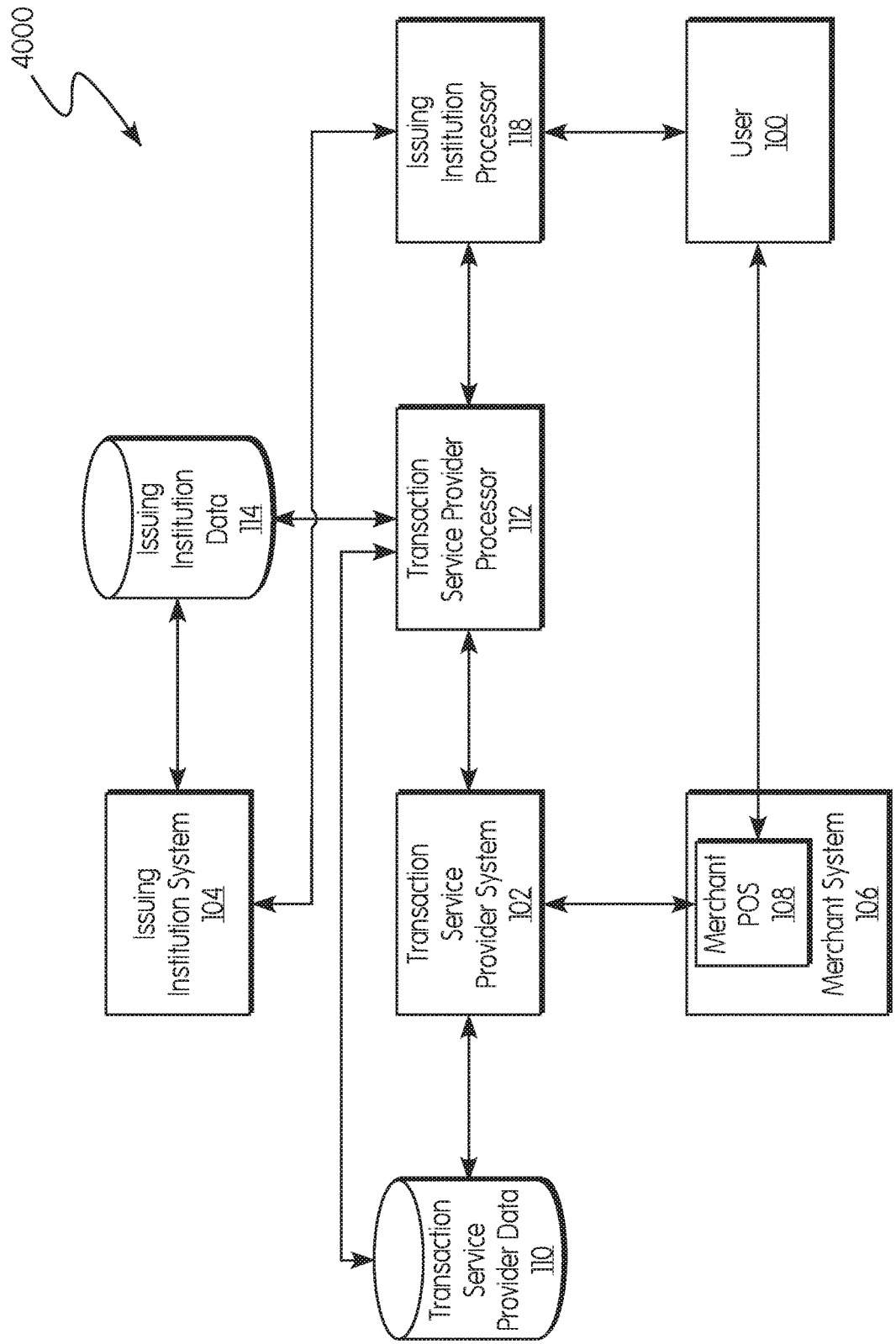
FIG. 4 is another schematic diagram of a system for segmenting a plurality of users in a first region based on predicted activity external to the first region according to a non-limiting embodiment.

Referring to FIG. 4, a system 4000 for segmenting a plurality of users in a first region based on predicted activity external to the first region is shown according to a non-limiting embodiment. The components of the system 4000 shown in FIG. 4 include all of the capabilities and characteristics of the components from the system 1000 of FIG. 1 having like reference numbers. In a non-limiting embodiment of the system 4000 shown in FIG. 4, the transaction service provider processor 112 may be in communication with an issuing institution processor 118. In some embodiments, the issuing institution processor 118 may be a separate computer system from the issuing institution system 104 or, in other examples, may be a part of the issuing institution system 104. The issuing institution processor 118 may be owned and/or controlled by or on behalf of the issuing institution. The issuing institution processor 118 may be located at the issuing institution or elsewhere and may be in communication with the issuing institution system 104. The issuing institution processor 118 may be located remotely from the transaction service provider processor 112. In a non-limiting embodiment of the system 4000 shown in FIG. 4, the issuing institution processor 118 may initiate at least one target action based on a communication from the transaction service provider processor 112 by communicating with the user 100 or some group of target users. For instance, the transaction service provider processor 112 may communicate data, such as a list of target users, to the issuing institution processor 118, which processes that data before taking a further target action, such as transmitting a communication to the user 100. The communication from the issuing institution processor 118 to the user 100 may include a web-based communication, an email communication, a text message, a telephone call, a push notification, and/or an instant message. The issuing institution processor 118 may identify at least one offer for a user and communicate that offer to that user. The communication may also be informational or associated with incentivizing the user 100 to use the portable financial device in connection with travel to the second region. The user 100 may also communicate with the issuing institution processor 118 using like communication methods.

Figure 5:
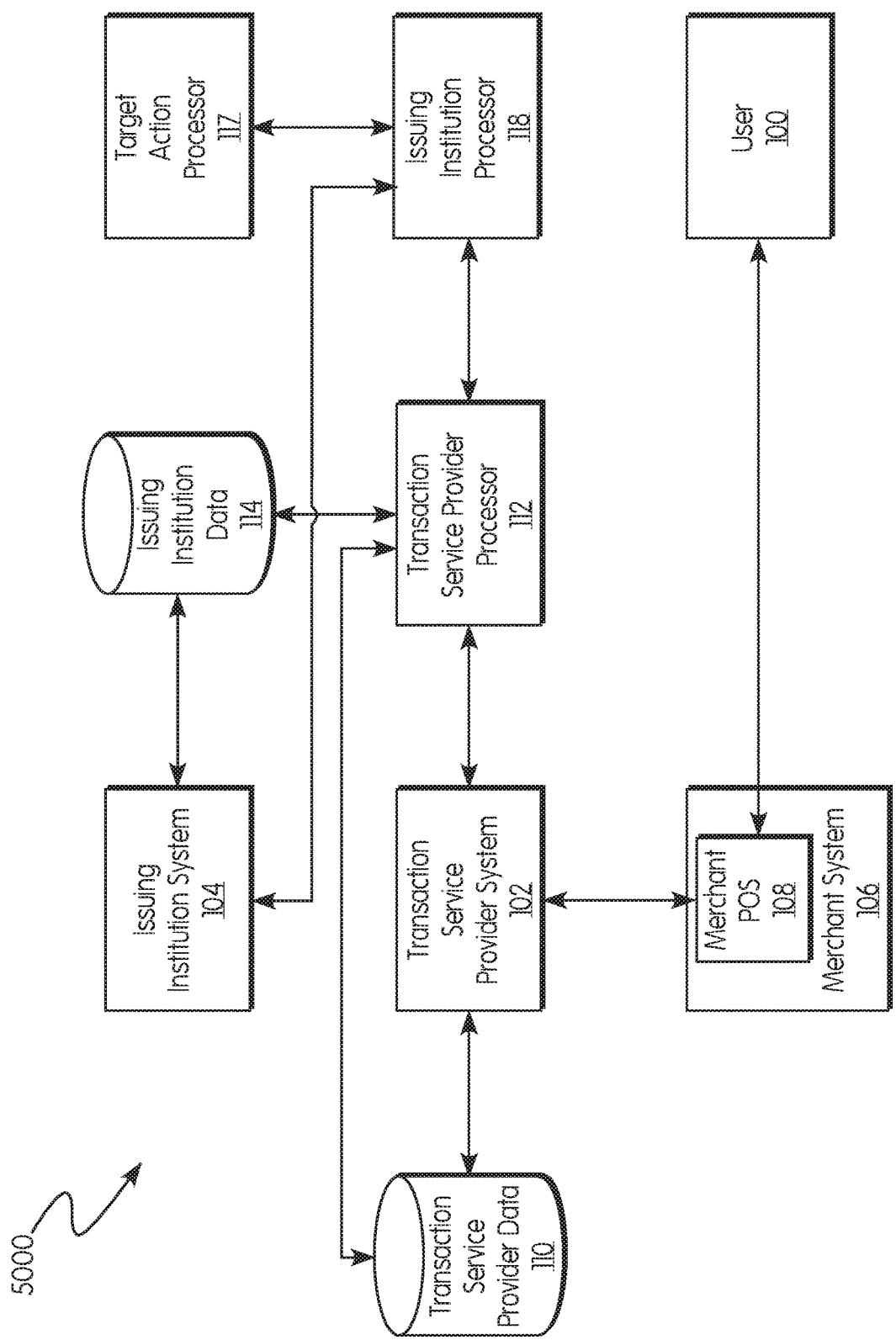
FIG. 5 is another schematic diagram of a system for segmenting a plurality of users in a first region based on predicted activity external to the first region according to a non-limiting embodiment.

Referring to FIG. 5, a system 5000 for segmenting a plurality of users in a first region based on predicted activity external to the first region is shown according to a non-limiting embodiment. The components of the system 5000 in FIG. 5 include all of the capabilities and characteristics of the components from the system 3000 of FIG. 3 or system 4000 of FIG. 4 having like reference numbers. In some non-limiting embodiments of the system 5000 shown in FIG. 5, the issuing institution processor 118 may initiate at least one target action based on a communication from the transaction service provider processor 112 by communicating with the issuing institution system 104 or the issuing institution database 114. For instance, the transaction service provider processor 112 may communicate data to the issuing institution processor 118, which processes that data. The issuing institution database 114 may be hosted by or on behalf of the issuing institution. In some non-limiting embodiments, the issuing institution processor 118 generates a list of target users associated with the issuing institution and communicates that list of target users to the issuing institution system 104 or the issuing institution database 114. The list may be used to, in turn, provide target users with an offer, or for other purposes, such as approving a user for a transaction in the second region or other target action.

With continued reference to FIG. 5, in some non-limiting embodiments the issuing institution processor 118 may initiate a target action by transmitting a signal to a target action processor 117. The target action processor 117 may be a separate computer system or, in other examples, may be a part of the issuing institution processor 118. This target action may include automatically approving a user of a plurality of target users for transactions in the at least one second region. A target action may also include any other action directed to incentivizing, educating, or encouraging a user in the subset of target users to use their portable financial device in the first region or second region.

Figure 6:
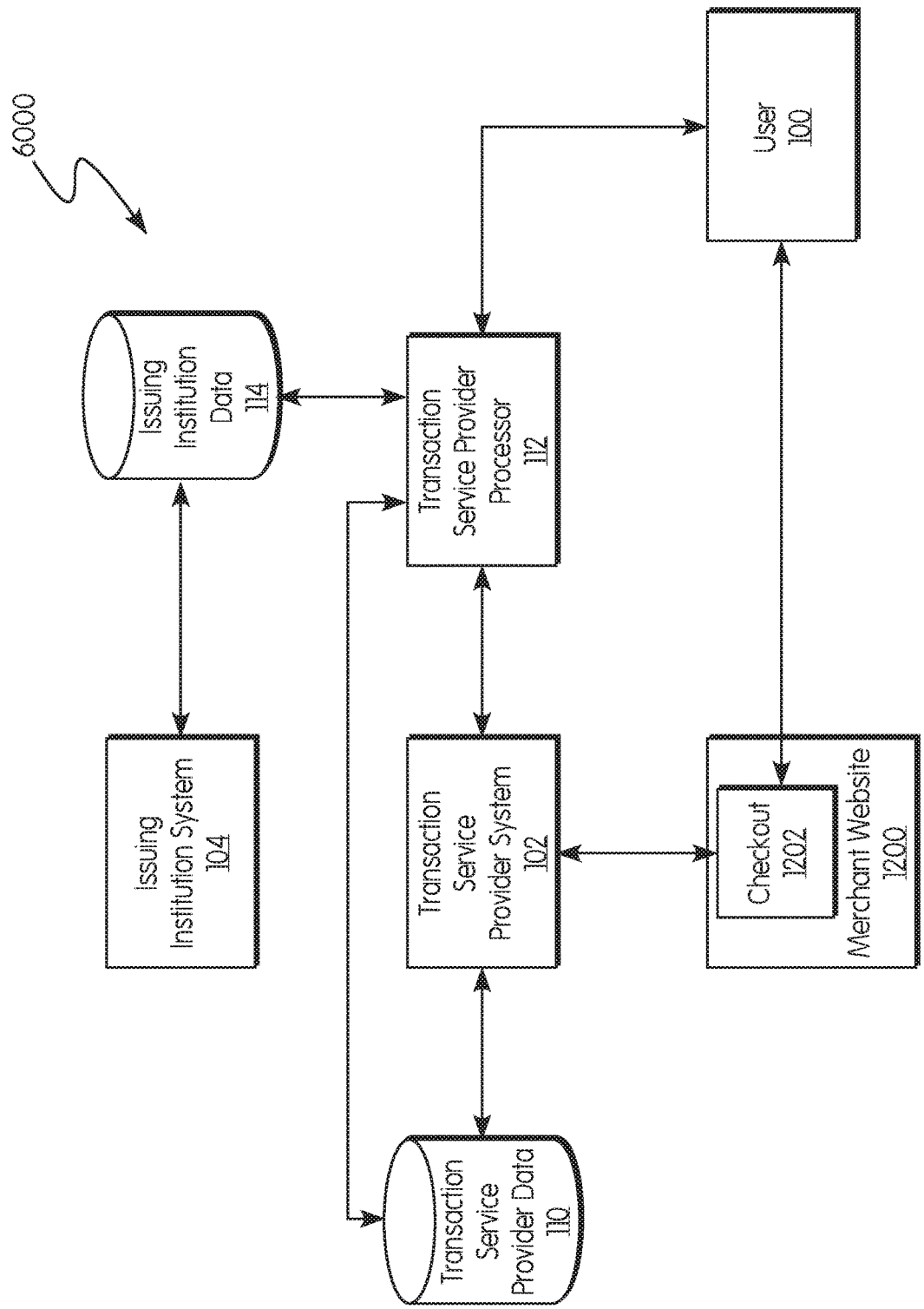
FIG. 6 is a schematic diagram of a system of segmenting a plurality of users based on predicted usage of a transaction mechanism according to a non-limiting embodiment.

Referring now to FIG. 6, a system 6000 for segmenting a plurality of users based on predicted usage of a transaction mechanism is shown according to a non-limiting embodiment. A user 100 may be a holder of a portable financial device (e.g., an account holder) associated with a transaction service provider and issued to the user 100 by an issuing institution. In some non-limiting embodiments, the user 100 is a holder of a portable financial device issued by an issuing institution that is associated with an account identifier. The user 100 may use the account identifier to initiate ecommerce transactions with various online merchants 1200 using a merchant checkout system 1202, such as a payment gateway, which communicates with the transaction service provider system 102 to complete payment of the financial transactions.

With continued reference to FIG. 6, in some non-limiting embodiments, the user 100 may purchase goods or services from the merchant website 1200 or a mobile application by inputting a PAN and/or other portable financial device data. A merchant checkout system 1202 of a merchant website 1200 may include an ecommerce checkout mechanism that accepts user credentials, such as a user name, password, biometric input, or the like, and facilitates an ecommerce transaction. The ecommerce checkout mechanism may be embedded in the merchant checkout system 1202 using an Application Programming Interface (API), although various arrangements are possible. For example, a user may input credentials that are communicated from the merchant checkout system 1202 to the transaction service provider system 102 and/or transaction service provider processor 112 to determine which account identifier(s) are associated with the credentials. In some examples, the transaction service provider system 102 and/or transaction service provider processor 112 may communicate one or more options to the merchant checkout system 1202, such as one or more selectable options for a user, through the merchant website 1200 or merchant checkout system 1202, to choose one or more accounts and/or account identifiers to use for the ecommerce transaction. In other embodiments, the transaction service provider system 102 and/or transaction service provider processor 112 may automatically select an account identifier to user for the ecommerce transaction.

Still referring to FIG. 6, a transaction service provider database 110 may include data associated with the following transaction parameters corresponding to a user: (1) user ecommerce transactions in merchant and/or spending categories in which the particular transaction mechanism is available, (2) overall user engagement in ecommerce transactions, (3) overall user engagement in transactions generally, and (4) increased frequency or volume in electronic transactions (e.g., using a physical portable financial device such as a mobile device). In some examples, the transaction parameters may be provided with different weights based on the relative importance of those parameters. In a non-limiting embodiment, (1) user ecommerce transactions in merchant and/or spending categories in which the particular transaction mechanism is available may have a high relative weight, (2) overall user engagement in ecommerce transactions and (3) overall user engagement in transactions generally may both have a medium relative weight, and (4) increased frequency or volume in electronic transactions may have a low relative weight. Using a gradient boosted model, numerous distinct trees may be generated based on the combination of transaction parameters that may be used to score a user. The scores of each distinct tree are summed to provide a single user score.

In non-limiting embodiments, after their individual propensities are determined, the users may be segmented into one or more groups. For example, users may be segmented into a "low propensity" group, a "medium propensity" group, and a "high propensity" group. It will be appreciated that, in some examples, users may be segmented into a "high propensity" group but there be no other groupings, just a remaining segment of ungrouped users. Target actions may be then directed to just users with a "high propensity" for utilizing a particular transaction mechanism. A "high propensity" user having a score in a top percentile, such as top 5%, 10%, 15%, 20%, 25%, 30%, 33%, 50% and/or the like.

The system and method for segmenting a plurality of users based on predicted usage of a transaction mechanism was validated based on test data. In a first country it was determined that 77% of users to adopt usage of an ecommerce checkout mechanism could be captured in the top 30% of scoring users. In a second country, it was determined that 71% of users to adopt usage of an ecommerce checkout mechanism could be captured in the top 30% of scoring users. Stated another way, in the first country and second country respectively, the top 10% of users were determined to be 4.6 times and 4.5 times more likely to adopt usage of an ecommerce checkout mechanism, the top 20% of users were determined to be 2 times and 1.8 times more likely to adopt usage of an ecommerce checkout mechanism, the top 30% of users were determined to be 1.1 times and 1.1 times more likely to adopt usage of an ecommerce checkout mechanism, the top 40% of users were determined to be 0.7 times and 1.0 times more likely to adopt usage of an ecommerce checkout mechanism, the top 50% of users were determined to be 0.6 times and 0.6 times more likely to adopt usage of an ecommerce checkout mechanism, the top 60% of users were determined to be 0.4 times and 0.5 times more likely to adopt usage of an ecommerce checkout mechanism, the top 70% of users were determined to be 0.3 times and 0.3 times more likely to adopt usage of an ecommerce checkout mechanism, the top 80% of users were determined to be 0.2 times and 0.3 times more likely to adopt usage of an ecommerce checkout mechanism, and the top 90% of users were determined to be 0.1 times and 0.3 times more likely to adopt usage of an ecommerce checkout mechanism.

Generating Recommendations Based on User Travel Information

Figure 7:
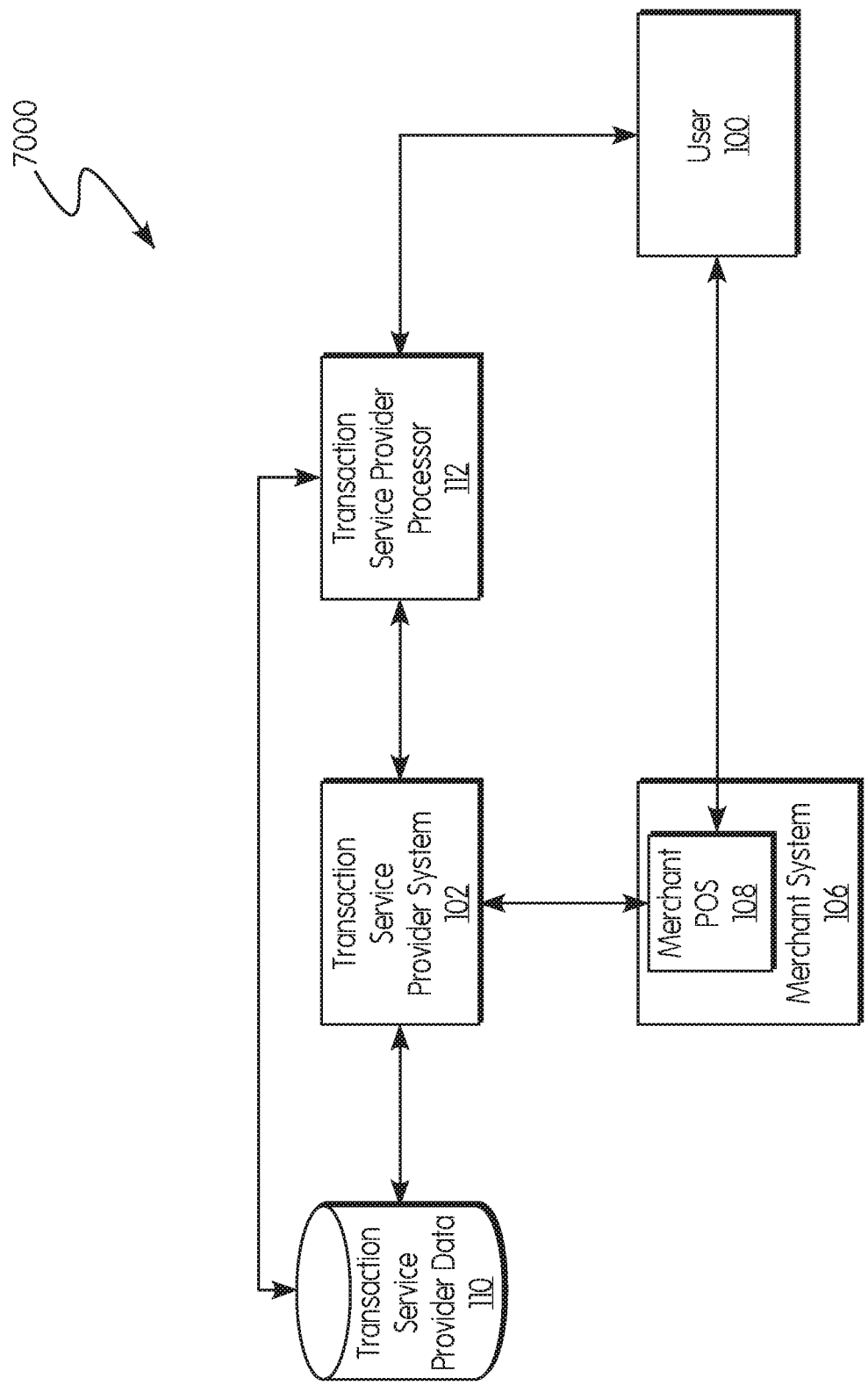
FIG. 7 is a schematic diagram of a system for generating recommendations based on predicted activity according to a non-limiting embodiment.

Referring to FIG. 7, a system 7000 system for generating recommendations based on predicted activity is shown according to a non-limiting embodiment. The components of the system 7000 in FIG. 7 include all of the capabilities and characteristics of the components from the system 1000 of FIG. 1 having like reference numbers. The system 7000 may include the following additional features.

As previously mentioned, the transaction service provider database 110 may store historical transaction data (e.g., prior transaction data) and other information about a plurality of users who use portable financial devices associated with the transaction service provider. The transaction data may include the list of transaction data previously provided. In one non-limiting embodiment, the transaction between the user 100 and the merchant 106 includes a transaction associated with a travel purchase of the user 100, associated with a trip of the user. The transaction data may further include itinerary information associated with the trip of the user, and this itinerary information may be stored on the transaction service provider database 10.

For example, the itinerary information may include relevant data associated with a hotel or other lodging accommodation associated with the trip of the user. The itinerary information associated with the hotel or other lodging accommodation may include information such as hotel (merchant) identifier (e.g., hotel name), hotel street address, hotel website, hotel rating (e.g., 5 star hotel), hotel rates (e.g., price per night), hotel amenities (e.g., free Wi-Fi, swimming pool, free breakfast, etc.), check-in time, check-out time, dates of user stay, and the like.

For example, the itinerary information may include relevant data associated with a flight associated with the trip of the user. The itinerary information associated with the flight may include airline (merchant) identifier (e.g., airline name), date of flight, takeoff time, landing time, flight duration, airport for takeoff, airport for landing, city of takeoff, city of landing, country of takeoff, country of landing, street address of takeoff airport, street address of landing airport, airport of layover(s), city of layover(s), ticket price, ticket class (e.g., first class, business class, economy, etc.), aircraft type, seat information (aisle and seat number), flight amenities (e.g., in-flight meals, in-flight entertainment, etc.), and the like. The itinerary information may be associated with a cruise ticket, a train ticket, a bus ticket, or any other mode of transportation and may include analogous information associated with the mode of transportation.

With continued reference to FIG. 7, the itinerary information may be communicated by the merchant POS 108 to the transaction service provider system 102 at the time of the processing of the payment of the financial transaction associated with the travel purchase (e.g., as part of a transaction message from the merchant POS 108 to the transaction service provider system 102 to request processing of a payment transaction). The transaction service provider system 102 may determine that the transaction message is associated with a travel purchase and identify the itinerary information in the transaction message. This itinerary information may be communicated to the transaction service provider database 110 for storage. In another non-limiting embodiment, the transaction service provider system 102 may store some or all of the transaction data from the transaction message on the transaction service provider database 110, and the transaction service provider processor 112 may determine that the transaction is associated with a travel purchase and identify the itinerary information stored by the transaction service provider system 102 on the transaction service provider database 110.

In some non-limiting examples, the merchant POS 108 may communicate the itinerary information to the transaction service provider system 102 as a part of the transaction message upon determining that the user is a member of a travel rewards program of the merchant, the transaction service provider, the issuer, or other entity. The travel rewards program may provide offers to the user based on travel purchases made by the user and based on the itinerary information from those travel purchases.

Figure 8:
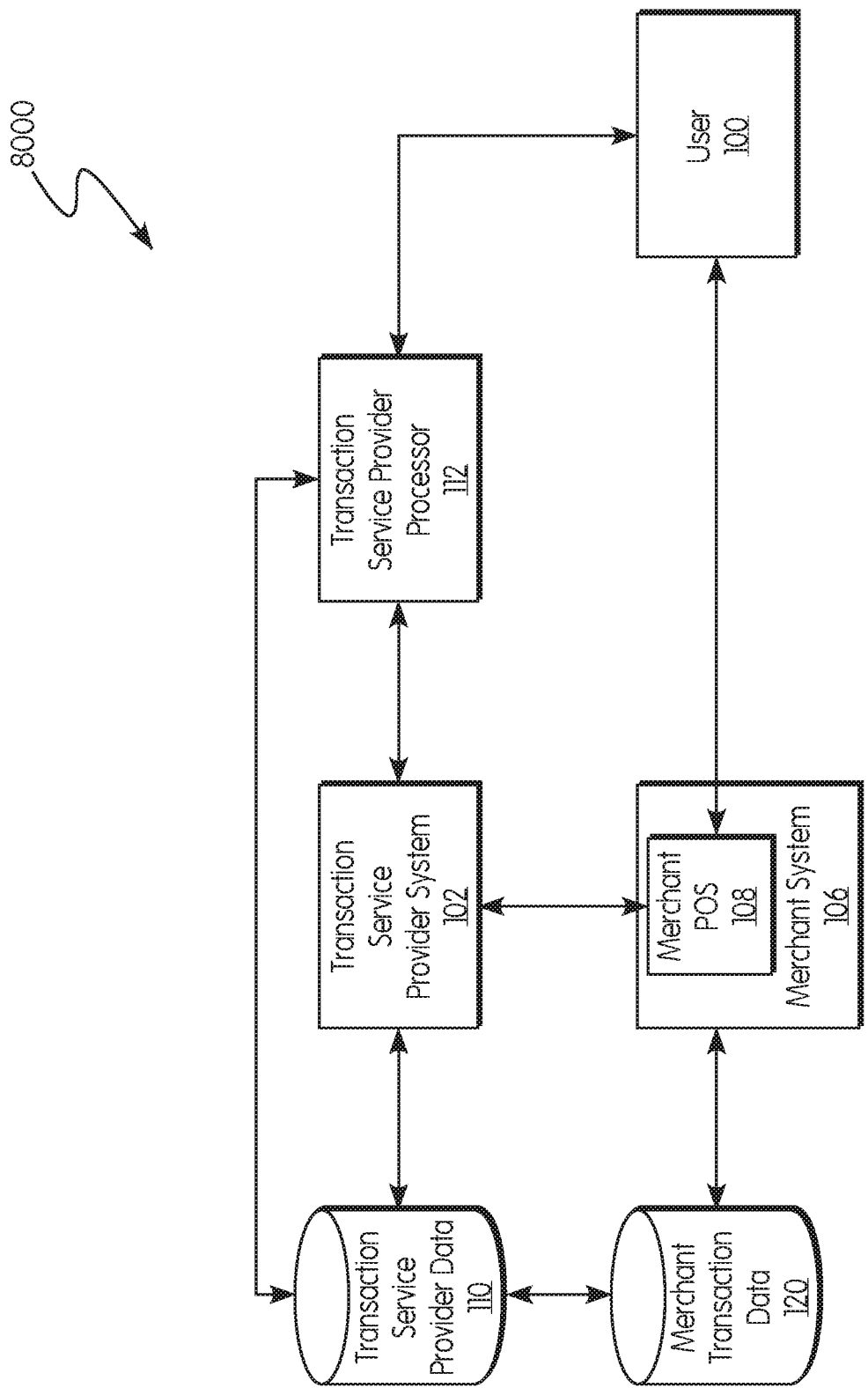
FIG. 8 is another schematic diagram of a system for generating recommendations based on predicted activity according to a non-limiting embodiment.

Referring to FIG. 8, a system 8000 system for generating recommendations based on predicted activity is shown according to a non-limiting embodiment. The components of the system 8000 in FIG. 8 include all of the capabilities and characteristics of the components from the system 7000 of FIG. 7 having like reference numbers. The system 8000 in FIG. 8 differs from the system 7000 in FIG. 7 in the following ways. In the system 8000 of FIG. 8, the itinerary information may not be included in the transaction message from the merchant POS 108 to the transaction service provider system 102.

The merchant POS 108 may communicate with a merchant transaction database 120 operated by or on behalf of the merchant. The merchant transaction database 120 may include data associated with transactions between the user and the merchant, such as the itinerary information previously discussed. The merchant POS 108 may communicate the itinerary information to the merchant transaction database 120 during or following a transaction associated with a travel purchase of the user.

With continued reference to FIG. 8, the merchant transaction database 120 may communicate with the transaction service provider database 110 to communicate the itinerary information to the transaction service provider database 110 for storage. The transaction service provider database 110 may communicate a request to the merchant transaction database 120 to request itinerary information associated with a user. The user may be a member of a travel rewards program. In another non-limiting embodiment, the merchant transaction database 120 may determine that the user is a member of a travel rewards program and, in response, communicate the itinerary information from the merchant transaction database 120 to the transaction service provider database 110.

Figure 9:
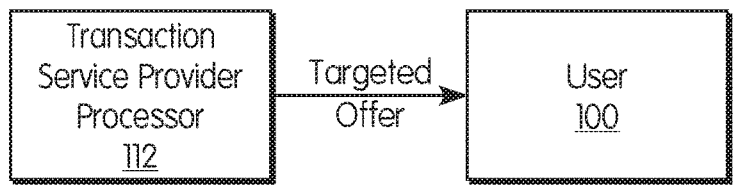
FIG. 9 is a schematic diagram of a system for generating a targeted offer based on itinerary information associated with a trip of a user.

Referring to FIG. 9, a system 9000 system for generating recommendations based on predicted activity is shown according to a non-limiting embodiment. In this non-limiting embodiment, the system 9000 generates a targeted offer (as the recommendation) based on itinerary information associated with a trip of a user. The transaction service provider processor 112 may receive itinerary information 122 from the transaction service provider database 110. A non-limiting example of the itinerary information 122 is shown in FIG. 9, which shows itinerary information 122 associated with a travel purchase of an airline ticket by a user. In this particular example, the user purchases an airline ticket for an approximately 1 month long trip from Singapore to San Francisco, which has a layover in Vietnam. The takeoff time or landing for each segment of the trip is shown. It will be appreciated further itinerary information 122 may be associated with this trip that is not shown in FIG. 9.

With continued reference to FIG. 9, the transaction service provider processor 112 may identify and analyze the itinerary information 122 and may automatically initiate at least one target action based on the itinerary information 122. The at least one target action may include any of the above-described target actions (e.g., provide a target offer, automatically approving a user of a plurality of target users for transactions in the a region (e.g., the destination location), or any other action directed to incentivizing, educating, or encouraging a user in the subset of target users to use their portable financial device). In the non-limiting embodiment in FIG. 9, the transaction service provider processor 112 may communicate a targeted offer to the user 100 based on the itinerary information as the target action.

With continued reference to FIG. 9, the targeted offer may be communicated from the transaction service provider processor 112 to the user 100 at a predetermined time based on the itinerary information. For example, the targeted offer may be communicated to the user 100 at a predetermined time prior to or during at least one date or time associated with the trip.

In one non-limiting example, based on the itinerary information, the transaction service provider processor 112 may determine a time during which the user will likely be waiting at an airport terminal waiting for a flight and may communicate the targeted offer to the user 100 at a predetermined time prior to the user waiting for the flight or while the user is waiting for the flight. In another non-limiting example, based on the itinerary information, the transaction service provider processor 112 may determine when the user will likely be in-flight and may communicate the targeted offer to the user 100 at a predetermined time prior to the user being in-flight or while the user is in-flight. In another non-limiting example, based on the itinerary information, the transaction service provider processor 112 may determine a time during which the user will likely be waiting at an airport terminal during a layover waiting for a flight and may communicate the targeted offer to the user 100 at a predetermined time prior to the user waiting for the flight during a layover or while the user is waiting for the flight during a layover. In another example, the transaction service provider processor 112 may determine a time during which the user will likely be at a specific destination (e.g., a destination of the trip, such as an airport terminal, city, etc.) and may communicate the targeted offer to the user 100 at a predetermined time prior to the user arriving at the destination or while the user is at the destination. In this way, the transaction service provider processor 112 may communicate the targeted offer to the user 100 at a time period that is relevant for the user or at a time period during which the user has free time to redeem the relevant offer.

With continued reference to FIG. 9, the subject matter of the targeted offer may be communicated from the transaction service provider processor 112 to the user 100 based on the itinerary information. For example, the targeted offer may be for a predetermined good and/or service, at a predetermined merchant, or for a predetermined location based on the itinerary information associated with the trip.

In one non-limiting example, based on the itinerary information, the transaction service provider processor 112 may determine a location associated with the trip, the location being a takeoff airport associated with the trip and may communicate an offer to the user 100 for a merchant in the takeoff airport. In another non-limiting example, based on the itinerary information, the transaction service provider processor 112 may determine a location associated with the trip, the location being a landing airport associated with the trip and may communicate an offer to the user 100 for a merchant in the landing airport. In another non-limiting example, based on the itinerary information, the transaction service provider processor 112 may determine a location associated with the trip, the location being a layover airport associated with the trip and may communicate an offer to the user 100 for a merchant in the layover airport. The time during which the user will likely be at the respective airport may also be considered during communication of the offer. Goods or service commonly purchase by users (or by the specific user) in an airport may also be considered, and an offer may be communicated that is relevant for those goods and/or services.

In another non-limiting example, the transaction service provider processor 112 may determine a location associated with the trip, the location being a destination associated with the trip and may communicate an offer to the user 100 for a merchant at the destination. The time during which the user will likely be at the destination may also be considered during communication of the offer. Goods or service commonly purchase by users (or by the specific user) at that destination may also be considered, and an offer may be communicated that is relevant for those goods and/or services.

In this way, the transaction service provider processor 112 may communicate a relevant offer to the user, the relevant offer being during a relevant or idle time for the user, directed to a merchant associated with a relevant location of the user, and/or for goods and/or services relevant to the user.

Referring back to FIGS. 7-9, the non-limiting embodiments of the system for generating recommendations based on predicted activity in connection with these FIGS. has described the target action being initiated (e.g., communicated) by the transaction service provider processor 112 to the user. However, it will be appreciated that the target action may be initiated by other processors, such as the previously described target action processor 117 and/or the issuing institution processor 118.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

The invention claimed is:

1. A computer-implemented method of generating recommendations based on predicted activity, comprising:
receiving, with at least one processor and from a merchant system, transaction data associated with a first transaction initiated by a user, wherein the first transaction comprises a travel purchase comprising a transit ticket;
during or after processing of the first transaction, receiving, with the at least one processor and from the merchant system, itinerary information associated with a trip associated with the transit ticket;
storing, with the at least one processor, the transaction data and the associated itinerary information in at least one database;
determining, with the at least one processor and based on the transaction data, that the first transaction is associated with a travel purchase;
in response to determining that the first transaction is associated with a travel purchase, identifying, with the at least one processor, the itinerary information associated with the trip, wherein the itinerary information comprises a time in the future during which the user will be in transit and at least one next destination associated with the trip;
based on the itinerary information stored in the at least one database, determining, with the at least one processor, the time in the future during which the user will be in transit;
based on the itinerary information stored in the at least one database and prior to the time in the future during which the user will be in transit, determining, with the at least one processor, the at least one next destination associated with the trip and generating a target offer associated with a merchant located proximate the at least one next destination, wherein the trip comprises one or more next destinations; and
based on the itinerary information stored in the at least one database and at the time during which the user will be in transit to the next destination, automatically initiating, with the at least one processor, at least one target action, wherein the at least one target action comprises communicating the target offer to a user device associated with the user such that the user device receives the target offer while in transit to the next destination.

2. The method of claim 1, wherein the transit ticket comprises an airline ticket and the itinerary information comprises a time associated with a takeoff time of a flight associated with the trip.

3. The method of claim 1, wherein the target offer is associated with an activity proximate the at least one next destination.

4. The method of claim 1, wherein the transit ticket comprises an airline ticket, a cruise ticket, a train ticket, and/or a bus ticket.

5. A system for generating recommendations based on predicted activity comprising at least one processor programmed or configured to:
receive transaction data from a merchant system, the transaction data associated with a first transaction initiated by a user, wherein the first transaction comprises a travel purchase comprising a transit ticket;
during or after processing of the first transaction, receive, from the merchant system, itinerary information associated with a trip associated with the transit ticket;
store the transaction data and the associated itinerary information in at least one database;
determine, based on the transaction data, that the first transaction is associated with a travel purchase;
in response to determining that the first transaction is associated with a travel purchase, identify the itinerary information associated with the trip, wherein the itinerary information comprises a time in the future during which the user will be in transit and at least one next destination associated with the trip;
based on the itinerary information stored in the at least one database, determine the time in the future during which the user will be in transit;
based on the itinerary information stored in the at least one database and prior to the time in the future during which the user will be in transit, determine the at least one next destination associated with the trip and generate a target offer associated with a merchant located proximate the at least one next destination, wherein the trip comprises one or more next destinations; and
based on the itinerary information stored in the at least one database and at the time during which the user will be in transit to the next destination, automatically initiate at least one target action, wherein the at least one target action comprises communicating the target offer to a user device associated with the user such that the user device receives the target offer while in transit to the next destination.

6. The system of claim 5, wherein the transit ticket comprises an airline ticket and the itinerary information comprises a time associated with a takeoff time of a flight associated with the trip.

7. The system of claim 5, wherein the target offer is associated with an activity proximate the at least one next destination.

8. The system of claim 5, wherein the transit ticket comprises an airline ticket, a cruise ticket, a train ticket, and/or a bus ticket.

9. A computer program product for generating recommendations based on predicted activity, the computer program product comprising at least one non-transitory computer-readable medium including one or more instructions that, when executed by at least one processor, cause the at least one processor to:
    receive transaction data from a merchant system, the transaction data associated with a first transaction initiated by a user, wherein the first transaction comprises a travel purchase comprising a transit ticket;
    during or after processing of the first transaction, receive, from the merchant system, itinerary information associated with a trip associated with the transit ticket;
    store the transaction data and the associated itinerary information in at least one database;
    determine, based on the transaction data, that the first transaction is associated with a travel purchase;
    in response to determining that the first transaction is associated with a travel purchase, identify the itinerary information associated with the trip, wherein the itinerary information comprises a time in the future during which the user will be in transit and at least one next destination associated with the trip;
    based on the itinerary information stored in the at least one database, determine the time in the future during which the user will be in transit;
    based on the itinerary information stored in the at least one database and prior to the time in the future during which the user will be in transit, determine the at least one next destination associated with the trip and generate a target offer associated with a merchant located proximate the at least one next destination, wherein the trip comprises one or more next destinations; and
    based on the itinerary information stored in the at least one database and at the time during which the user will be in transit to the next destination, automatically initiate at least one target action, wherein the at least one target action comprises communicating the target offer to a user device associated with the user such that the user device receives the target offer while in transit to the next destination.

10. The computer program product of claim 9, wherein the transit ticket comprises an airline ticket and the itinerary information comprises a time associated with a takeoff time of a flight associated with the trip.

11. The computer program product of claim 9, wherein the transit ticket comprises an airline ticket, a cruise ticket, a train ticket, and/or a bus ticket.

12. The computer program product of claim 9, wherein the target offer is associated with an activity proximate the at least one next destination.

* * * * *